United States Patent
Iwasaki

[11] Patent Number: 5,235,454
[45] Date of Patent: Aug. 10, 1993

[54] LIGHT BEAM SCANNER

[75] Inventor: Takeo Iwasaki, Nagoya, Japan

[73] Assignee: Brother Kogyo Kabushiki Kaisha, Nagoya, Japan

[21] Appl. No.: 848,194

[22] Filed: Mar. 10, 1992

[30] Foreign Application Priority Data

Mar. 19, 1991 [JP] Japan .................. 3-54939

[51] Int. Cl.$^5$ .................. G02B 26/08
[52] U.S. Cl. .................. 359/198; 359/214; 359/219; 359/221; 310/90.5; 310/268
[58] Field of Search .................. 359/196–200, 359/212–214, 216, 223, 226, 221, 219, 215, 205; 310/40 R, 36, 254, 261, 273, 905, 268

[56] References Cited

U.S. PATENT DOCUMENTS

| | | | |
|---|---|---|---|
| 2,894,156 | 7/1959 | Kent | 310/40 R |
| 3,865,465 | 2/1975 | Tatuoka et al. | 359/205 |
| 3,999,010 | 12/1976 | Oosaka et al. | 358/302 |
| 4,302,720 | 11/1981 | Brill | 359/213 |
| 4,364,000 | 12/1982 | Burke | 310/36 |
| 4,443,043 | 4/1984 | Yamaguchi | 359/218 |
| 4,538,081 | 8/1985 | Kamiya et al. | 310/90.5 |
| 4,726,640 | 2/1988 | Iwama et al. | 310/90.5 |
| 4,754,185 | 6/1988 | Gabriel et al. | 310/309 |
| 4,934,781 | 6/1990 | Kato et al. | 310/90.5 |
| 4,939,120 | 7/1990 | Moon et al. | 310/90.5 |
| 5,051,757 | 9/1991 | Hasegawa | 346/160 |
| 5,101,130 | 3/1992 | Jayawant et al. | 310/90.5 |
| 5,142,176 | 8/1992 | Takahashi | 310/90.5 |
| 5,159,219 | 10/1992 | Chu et al. | 310/90.5 |
| 5,191,251 | 3/1993 | Paratte | 310/268 |

FOREIGN PATENT DOCUMENTS

57-49889 10/1982 Japan .

Primary Examiner—Bruce Y. Arnold
Assistant Examiner—James Phan
Attorney, Agent, or Firm—Oliff & Berridge

[57] ABSTRACT

A light scanning device has a laser beam generator, a reflecting mirror supported by a rotatable device and a driving mechanism for driving the rotatable device. The rotatable device includes a stator having a plurality of electrodes and a rotor having a plurality of electrodes opposed to the stator electrodes. The rotor is rotatably provided on the stator and is driven by an electrostatic force generated by selectively applying a voltage to the stator electrodes while supported in a non-contact state with the stator. The mirror preferably has a single mirror surface and therefore can be driven at a high deflecting speed.

20 Claims, 10 Drawing Sheets

Fig.19
RELATED ART

LIGHT BEAM SCANNER

BACKGROUND OF THE INVENTION

1. Field of the Invention

The present invention relates to a light deflecting unit for deflecting a light beam and, more particularly, to a light deflecting unit such as a light beam scanner utilized in a xerographic printer for deflecting a laser beam.

2. Description of Related Art

Generally, a xerographic printer for recording image information supplied from a host computer is well known as an apparatus in which a light deflecting unit is utilized. Hereinafter, a conventional light scanning device of the xerographic printer is described with reference to FIG. 19.

Figure 19:
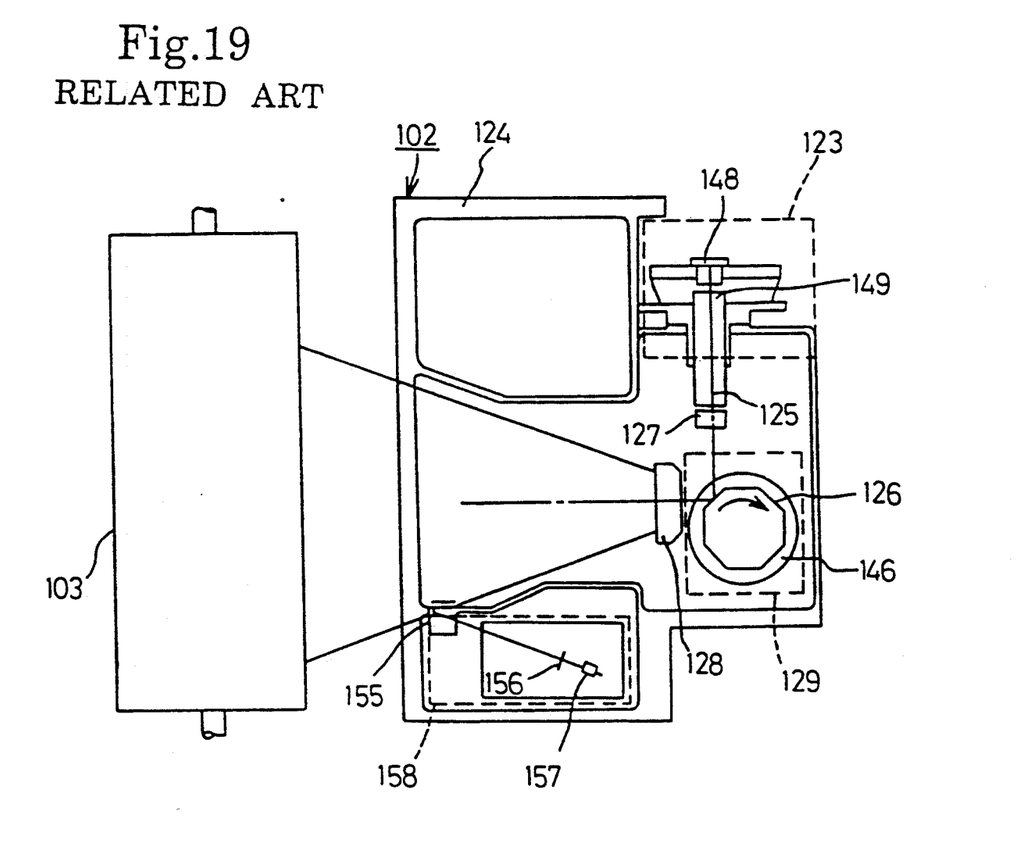
FIG. 19 is a plan view of a light scanning device including a conventional light deflecting unit.

A light scanning device 102 for scanning a photosensitive drum 103 as a recording medium with a laser beam includes a laser unit 123, a light deflecting unit 129 and a beam detecting unit 158. The laser unit 123 has a semiconductor laser 148 for generating a laser beam and a collimator lens 149 disposed integrally with the semiconductor laser 148. The semiconductor laser 148 emits a laser beam modulated on the basis of image data. The laser beam from the semiconductor laser 148 passes through the collimator lens 149 and becomes a collimated beam coincident with an optical axis of the collimator lens 149. The laser beam emitted from the collimator lens 149 is conducted to an incident aperture of a beam expanding optical system 125, whereby it is expanded in diameter as the collimated beam. The laser beam emitted from the beam expanding optical system 125 converges in a direction orthogonal to a horizontal plane, and the thus-converged beam is incident on the light deflecting unit 129.

The light deflecting unit 129 is provided with a polygon mirror 126 having eight mirror surfaces and a motor 146 having an output shaft. The polygon mirror 126 is fixed to the output shaft of the motor 146 which drives the motor 126 at a high revolution. The output shaft of the motor 146 is supported rotatably by a non-contact type bearing. When the polygon mirror 126 is rotated, a laser beam incident on a mirror surface of the polygon mirror is swept approximately horizontally and is deflected at an equal angular velocity. The laser beam thus deflected by the polygon mirror 126 is focused as a light spot onto the photosensitive drum 103 by means of a known focusing lens 128 having fθ characteristics.

The polygon mirror 126 is formed mainly from aluminum by cutting. For increasing the laser beam deflecting speed, it is necessary to rotate the polygon mirror 126 at a high speed. To this end, the motor 146 uses an electromagnetic force and is capable of rotating at a high speed of 10,000 r.p.m. or more, e.g., a known hysteresis synchronous motor or DC servomotor. In the case where the motor 146 is driven at a high speed of 10,000 r.p.m. or more, non-contact type bearings are used as output shaft bearings. A magnetic bearing may be used as a non-contact bearing in the thrust direction, and a pneumatic bearing may be used as a non-contact bearing in the radial direction, as described in Japanese Patent Publication No. 57-49889. If rotation at a high speed exceeding 10,000 r.p.m. is performed using a contact type bearing, e.g., a ball bearing, problems of wear and heat generation of the bearing balls may arise, thus preventing the polygon mirror 126 from being rotated at a high speed and rendering it impossible to increase the laser beam deflecting speed.

The beam detecting unit 158 is provided with a reflecting mirror 155, a slit plate 156 having a small incident slit, and a photoelectric conversion element 157 which is high in response speed, e.g., PIN diode. When a laser beam which has been swept by the light deflecting unit 129 reaches a reference position, it is reflected by the reflecting mirror 155, then passes through the slit plate 156 and is detected by the photoelectric conversion element 157. Upon detection of the laser beam, the photoelectric conversion element 157 produces a detected signal. This detected signal is used to determine an emission start timing of the laser beam from the semiconductor laser 148, beam of which has been modulated on the basis of image data.

The following problems occur in the processing accuracy of the polygon mirror 126 and the mounting accuracy of the polygon mirror 126 to the motor 146. First, if there is an angle division error in the polygon mirror 126, that is, if the mirror surfaces of the polygon mirror are different in length in the scanning direction, a positional deviation in the scanning direction of the laser beam which is focused on the photosensitive drum 103 will arise. Second, if there is an error of parallelism between each mirror surface of the polygon mirror 26 and a rotational axis of the polygon mirror, that is, if each mirror surface is not perpendicular to a horizontal plane, a positional deviation in the direction orthogonal to the scanning direction of the laser beam which is focused on the photosensitive drum 103 will arise, that is, an unevenness in scanning line pitch will occur.

In the above conventional light scanning device 102, a laser beam is detected directly by the beam detecting unit 158 and a reference position is detected for each mirror surface. Even if there is an angle division error in the polygon mirror 126, the emission start timing of a laser beam from the semiconductor laser 148 is adjusted for each mirror surface on the basis of the detected reference position, so that a positional deviation in the scanning direction of the laser beam focused on the photosensitive drum 103 is prevented. Moreover, in the conventional light scanning device 102 a laser beam converges in the direction orthogonal to a horizontal plane by means of the cylindrical lens 127 and is focused on a mirror surface of the polygon mirror 126. Therefore, even if there is a parallelism error of each mirror surface, a positional deviation in the direction orthogonal to the scanning direction of the laser beam focused on the photosensitive drum 103 is prevented. The technique for converging a laser beam in the direction orthogonal to its scanning direction and focusing it on a mirror surface of the polygon mirror, is disclosed in detail in U.S. Pat. No. 3,865,465.

However, in the conventional light scanning device 102 described above, since the motor 146 for rotating the polygon mirror 126 employs an electromagnet, it is necessary to form within the motor 146 a magnetic circuit within the motor 146 including a winding of coil, a permanent magnet, a yoke and a core. Consequently, the size of the motor 146 and hence the size of the light deflecting unit 129 must be increased.

Moreover, in the above conventional scanning device 102 in order to increase the laser beam deflecting speed, non-contact type bearings, a magnetic bearing in the thrust direction and a pneumatic bearing in the radial direction are used as output shaft bearings for the motor 146. On the other hand, since at least one of the constituents of the magnetic circuit, i.e., the winding of coil, the permanent magnet, the yoke or the core, is supported by the rotor integral with the output shaft of the motor 146 which uses an electromagnetic force, the inertia of the output shaft becomes relatively large. Accordingly, for stably supporting such an output shaft having a relatively large inertia, it is necessary to use a large-sized non-contact bearing such as a pneumatic bearing which requires a wide area for supporting the output shaft. Consequently, the light deflecting unit 129 including the bearing mechanism becomes complicated in structure and larger in size, thus leading to an increased cost.

SUMMARY OF THE INVENTION

It is an object of the present invention to provide a light deflecting unit which is small in size and high in deflecting speed.

It is another object of the present invention to provide a light deflecting unit which, despite of a high deflecting speed, is small-sized, simple in structure and inexpensive.

In order to achieve the above-mentioned objects, the light deflecting unit according to the present invention includes a stator having a plurality of stator electrodes; a rotor rotatably provided on the stator and having a plurality of rotor electrodes opposed to the stator electrodes of the stator; a reflecting mirror supported by the rotor and rotatable together with the rotor; driving means for selectively applying a voltage to the stator electrodes to drive the rotor by an electrostatic force; and supporting means for supporting the rotor in a non-contact state with the stator at least while the rotor is driven by the driving means.

In the light deflecting unit of the present invention, the driving means selectively applies a voltage to the stator electrodes. As a result, an electrostatic force is generated between the stator electrodes and the rotor electrodes, whereby the rotor is rotated with respect to the stator. While the driving means drives the rotor, the supporting means supports the rotor in a non-contact state with the stator. When the rotor is rotated by the driving means, the reflecting mirror supported by the rotor is rotated together with the rotor. If a light beam is incident on the reflecting mirror being rotated, it will be deflected and swept by the reflecting mirror.

According to the light deflecting unit of the present invention, the reflecting mirror is rotated together with the rotor which is driven by an electrostatic force. Therefore, it is not necessary to provide the winding of coil, a permanent magnet, a yoke and a core as components of a magnetic circuit. Besides, since merely a plurality of electrodes are supported by the rotor, the rotor inertia is very small. Consequently, the supporting means for supporting the rotor in a non-contact state can be made very small in size. Further, although an electrostatic force is weaker as a driving force than an electromagnetic force, since the rotor inertia is very small and the support means is small in size and hence the resistance in rotation is low, it is possible to rotate the rotor sufficiently at a high speed using an electrostatic force. As a result, according to the present invention it is possible to provide a light deflecting unit which, despite of a high deflecting speed, is small in size, simple in structure and inexpensive.

BRIEF DESCRIPTION OF THE DRAWINGS

Preferred embodiments of the present invention will be described in detail hereinafter with reference to the accompanying drawings, wherein.

DETAILED DESCRIPTION OF THE PREFERRED EMBODIMENTS

Figure 1:
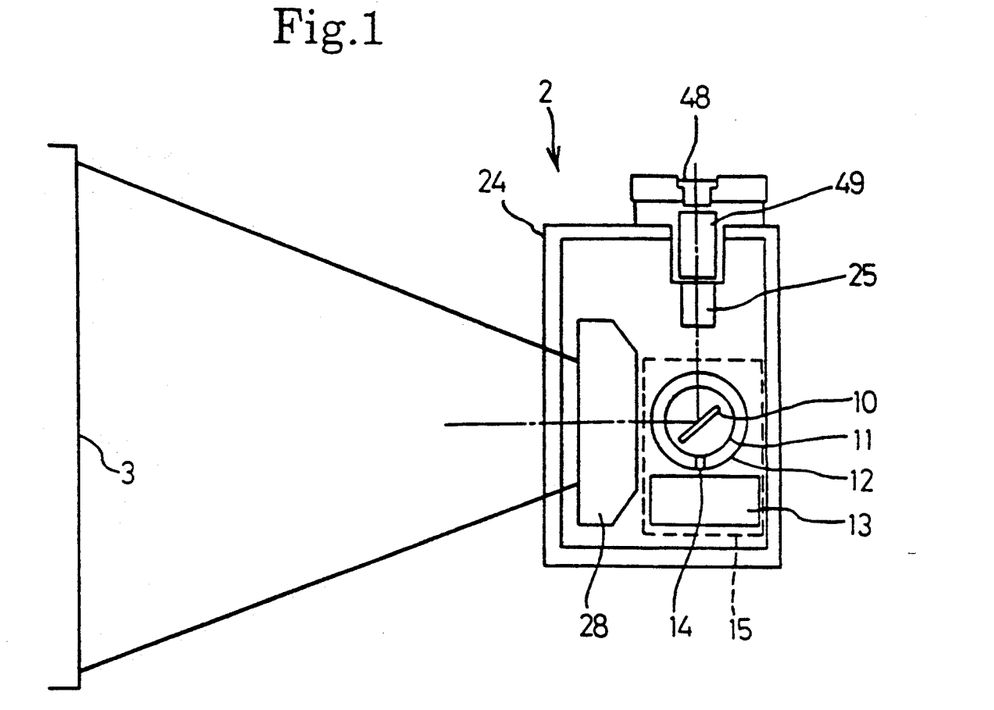
FIG. 1 is a plan view of a light scanning device including a light deflecting unit in an embodiment according to the present invention.

FIG. 1 is a plan view showing a light scanning device 2 in a xerographic printer to which the present invention is applied. A photosensitive drum 3 functions as a recording medium which is scanned with a laser beam from light scanning device 2. Light scanning device 2 comprises a casing 24 surrounding a laser unit having a semiconductor laser 48 which generates a laser beam and a collimator lens 49 integral with the semiconductor laser 48, a light detecting unit 15 and a focusing lens 28.

The semiconductor laser 48 generates an intensity-modulated laser beam in response to an external input signal based on image data. The laser beam emitted from the semiconductor laser 48 is incident on the collimator lens 49. The collimator lens 49 is disposed relative to the semiconductor laser 48 in such a manner that an optical axis of the laser beam generated by the semiconductor laser 48 and the optical axis of the collimator lens 49 are coincident with each other and the light emitting face of the semiconductor laser is coincident with a focal point of the collimator lens. Therefore, the laser beam emitted from the semiconductor laser 48 passes through the collimator lens 49 and thereby becomes a collimated beam whose optical axis is coincident with that of the collimator lens.

The collimated beam from the collimator lens 49 is applied to a beam expanding optical system 25. The laser beam emitted from the collimator lens 49 has a beam pattern of an elliptical section, and, by passing through the beam expanding optical system 25, is changed into a laser beam having a beam pattern of a circular section suitable for focusing the laser beam as a light spot onto the photosensitive drum 3.

In the case where the collimated beam from the collimator lens 49 is focused in the form of a spot by a focusing lens 28 without passing through the beam expanding optical system 25, a minimum diameter of the spot, dmin, is given as follows:

$$dmin = f\lambda/A$$

wherein,
f represents the focal length of the focusing lens;
λ represents the wavelength of light; and
A represents the diameter of the beam incident on the focusing lens (incident beam diameter). If the focal length f and the light wavelength λ are constant, the minimum spot diameter dmin becomes smaller with an increase in incident beam diameter A. Thus, the minimum spot diameter of the laser beam focused on the photosensitive drum 3 can be made smaller by expanding the diameter of the collimated beam from the collimator lens 49 through the beam expanding optical system 25. In the case where a required minimum spot diameter dmin is obtained by the diameter of the beam after emanating from the collimator lens 49, the beam expanding optical system 25 may be omitted.

The laser beam expanded in diameter as the collimated beam by the beam expanding optical system 25 is incident on a mirror surface of a rotatable reflecting mirror 10 in the light deflecting unit 15. The light deflecting unit 15 includes an electrostatic motor having a rotor 11 and a stator 12, a controller 13 for driving the electrostatic motor, a rotational position detector 14 for detecting a rotational position of the rotor 11, and the reflecting mirror 10 provided on the rotor 11. A detailed description of the light deflecting unit 15 is set forth below. The laser beam incident on the light deflecting unit 15 is swept substantially horizontally and deflected at an equal angular speed by the reflecting mirror 10 which is rotating.

The laser beam thus swept approximately horizontally by the reflecting mirror 10 is then focused as a light spot onto the photosensitive drum 3 by the focusing lens 28 having a fθ characteristic. Focusing lenses generally have the following relationship with respect to a focusing position r when an incident angle of the optical axis is θ: r=f·tan θ, wherein f is a focal length of the focusing lens. However, in the case of a laser beam reflected by the reflecting mirror 10 which rotates at a constant speed, as in this embodiment, the angle θ of incidence on the focusing lens 28 changes as a linear function. Therefore, if a laser beam is turned on and off at certain predetermined time intervals and a line of spots are radiated onto the photosensitive drum 3, the spacing of the spots becomes wider at both end portions of the line in comparison with the central portion of the line. To avoid this phenomenon, the focusing lens 28 is designed to have the characteristic r=f·θ. Such a focusing lens 28 is designated as fθ lens.

Once the laser beam deflected by the light deflecting unit 15 is focused onto the photosensitive drum 3 by the focusing lens 28, a latent image based on image data is formed on the same drum. The latent image thus formed on the photosensitive drum 3 is developed into a visible image by a electrophotographic process such as those known, then transferred and fixed onto a transfer material which is generally ordinary paper, and output as a hard copy.

Figure 2:
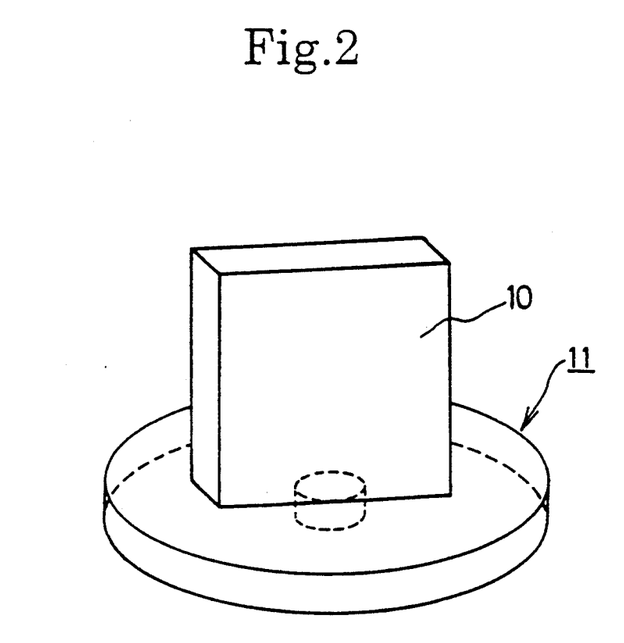
FIG. 2 is a perspective view showing a rotor and a reflecting mirror both employed in the light deflecting unit.

The light deflecting unit 15 will now be described in detail. For example, as shown in FIG. 2, the reflecting mirror 10 has a single mirror surface which is a square shape of about 4 mm ×4 mm, having a thickness of about 1 mm. The reflecting mirror 10 is formed by a known method, for example, by vapor-depositing aluminum on float glass. Preferably, the reflecting mirror 10 has a surface roughness of λ/8 or less in terms of an average square error. The reflecting mirror 10 is fixed onto the rotor 11 which is formed in the shape of a disk.

Figure 3:
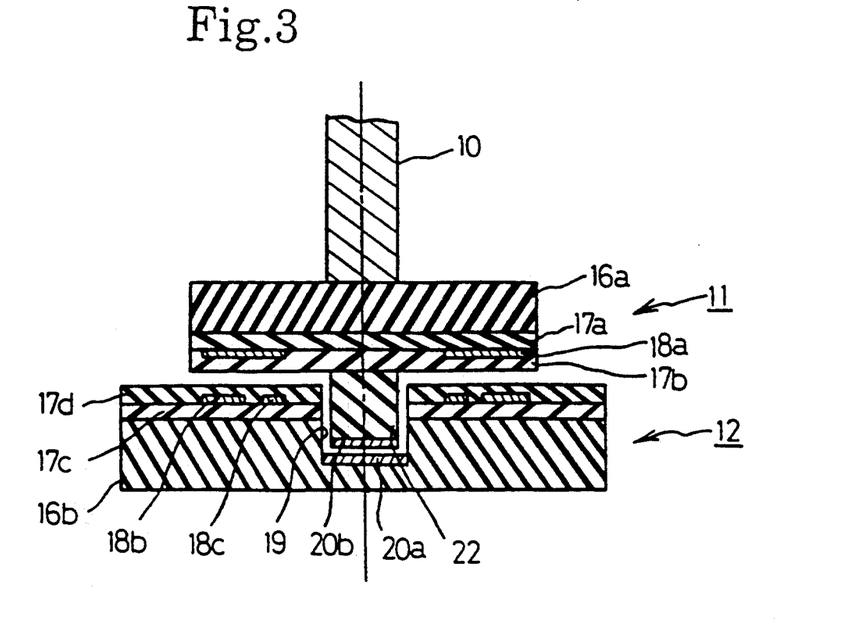
FIG. 3 is a sectional view of the light deflecting unit.

As shown in FIG. 3, rotor 11 comprises a disk-like base 16a made of silicon and insulating layers 17a and 17b. The insulating layer 17a is formed on the underside of the base 16a, and the insulating layer 17b is formed on the underside of the insulating layer 17a. Further, between the insulating layers 17a and 17b there is a plurality of aluminum electrodes 18a. The rotor 11 can be fabricated in the following manner. First, an insulating layer 17a of silicon dioxide or silicon nitride in thickness of about 0.3 to 2 μm is deposited onto the surface of silicon base 16a. Next, a plurality of aluminum electrodes 18a are deposited on the surface of the insulating layer 17a according to the photolithography technique. Then, another insulating layer 17b is deposited on the surface of the insulating layer 17a. Lastly, the surface of the insulating layer 17b is polished into a flat surface.

Figure 4:
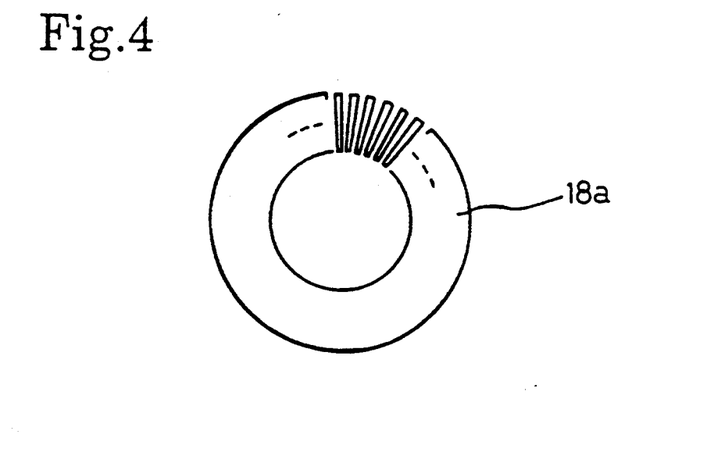
FIG. 4 is a plan view showing an arrangement of rotor electrodes employed in the light deflecting unit.

A cylindrical portion 22 is formed centrally at the lower end of the rotor 11, and a magnetic material 20b is fixed to the lower end of the cylindrical portion 22. The magnetic material 20b is magnetized beforehand in the direction of a rotational axis of the rotor 11, and its underside is magnetized to an N pole, for example. As shown in FIG. 4, the plural aluminum electrodes 18a provided on the rotor 11 comprise, for example, an assembly of sectors each about 6 μm wide and 1 mm long. They are formed radially with an inside diameter of about 3 mm, an outside diameter of about 5 mm and circumferential intervals of about 12 μm.

Also shown in FIG. 3, stator 12 comprises a silicon disk-like base 16b with insulating layers 17c and 17d. The insulating layer 17c is formed on the upper surface of the base 16b, and the insulating layer 17d is formed on the upper surface of the insulating layer 17c. Further, aluminum electrodes 18b and 18c are formed between the insulating layers 17c and 17d. The stator 12 can be fabricated in the following manner. First, the insulating layer 17c is deposited onto the surface of the base 16b in thickness of about 0.3 to 2 μm using silicon dioxide or silicon nitride. Next, using the photolithography technique, the plurality of aluminum electrodes 18b and 18c are deposited on the surface of the insulating layer 17c. Then, another insulating layer 17d is deposited on the surfaces of the aluminum electrodes 18b, 18c and the surface of the insulating layer 17c. Lastly, the surface of the insulating layer 17d is polished into a flat surface.

Figure 5:
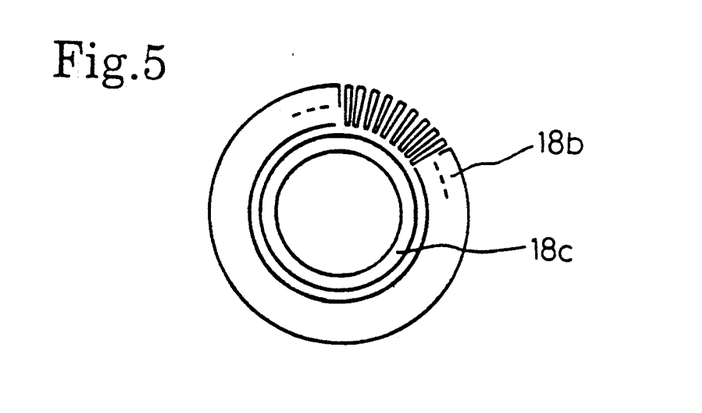
FIG. 5 is a plan view showing an arrangement of stator electrodes employed in the light deflecting unit.

A circular hole 19 is formed centrally in the upper end of the stator 12 for loosely receiving the cylindrical portion 22 of the rotor 11, and a magnetic material 20a is fixed to the bottom of the circular hole 19. The magnetic material 20a is magnetized beforehand in the rotational axis direction of the rotor 11, and the upper surface thereof is magnetized to the same pole, e.g., an N pole, as that of the lower surface of the magnetic material 20b. As shown in FIG. 5, the plural aluminum electrodes 18b provided on the stator 12 are formed, for example, as an assembly of sectors each about 6 μm wide and 0.5 mm long, for example. They are formed radially with an inside diameter of about 4 mm, an outside diameter of about 5 mm and circumferential intervals of about 8 μm. The aluminum electrode 18c provided on the stator 12 is formed in the shape of a ring having an inside diameter of about 3 mm and an outside diameter of about 3.4 mm.

Alternatively, the stator 12 may be provided with the cylindrical protrusion, and the rotor may be provided with the cylindrical depression for receiving the protrusion of the stator. Also, an annular protrusion and depression may be formed on the rotor and stator, respectively, or vice versa.

In operation, the controller 13 selectively applies a voltage to the plurality of capacitors of the electrodes 18a of the rotor 11 and the electrodes 18b and 18c of the stator 12 disposed opposite to the electrodes 18a. As a result, an electrostatic force is generated and the rotor 11 is thereby rotated with respect to the stator 12. The operation principle of the electrostatic motor will be described in detail below. As the rotor 11 is rotated, it floats from the stator 12 while maintaining its center of rotation on the basis of both a repulsive force exerted between the magnetic material 20a of the stator and the magnetic material 20b of the rotor 11 and a central restraint force induced by a viscous resistance of air between the circular hole 19 of the stator 12 and the cylindrical portion 22 of the rotor 11. Consequently, during rotation, the rotor 11 is supported in a state of non-contact with the stator 12.

A rotational position detector 14 is disposed on the stator 12 for detecting a rotational position of the rotor 11, as shown in FIG. 3. Any type of capacitance detector, magnetic field detector and optical position detector which are high in response speed may be used as the rotational position detector 14. The rotational position detector 14 detects the rotational position of the rotor 11, that is, the rotational position of the reflecting mirror 10, and generates a detected signal, which is used as a signal indicative of a reference position of the reflecting mirror 10. Therefore, based on the detected signal from the rotational position detector 14, an emission start timing of the laser beam is determined, which has been modulated on the basis of image data from the semiconductor laser 48. In other words, the detected signal from the rotational position detector 14 is used for determining a start timing of an input signal to the semiconductor laser 48, where the signal provides desired optical information onto the photosensitive drum 3.

In the light scanning device 2 of this embodiment, since the reflecting mirror 10 has only one mirror surface, the following advantages are attained in comparison with the use of a polygon mirror having plural mirror surfaces. When using a polygon mirror having plural mirror surfaces, in order to correct an angle division error between mirror surfaces, it is necessary to provide a beam detecting unit for detecting a deflected laser beam directly and thereby detect a reference position for each mirror surface. According to the present invention, since there is only one mirror surface of the reflecting mirror 10, an angle division error does not occur. Therefore, it is not necessary to directly detect a deflected laser beam. A reference position of the mirror surface of the reflecting mirror 10 can be detected easily by detecting a rotational position of the rotor 11 with the reflecting mirror 10 fixed thereto, using the rotational position detector 14. Thus, a beam detecting unit having a large occupied volume is not required, and hence the light scanning device 2 can be made compact.

When using a polygon mirror having a plurality of mirror surfaces, in order to correct a parallelism error between mirror surfaces it has heretofore been necessary to provide a cylindrical lens to converge a laser beam in the direction orthogonal to the beam scanning direction and focus it onto a mirror surface of the polygon mirror. According to the present invention, a parallelism error does not occur because the reflecting mirror 10 has only one mirror surface. Therefore, it is not necessary to provide a cylindrical lens. Thus, not only can the light scanning device 2 be made compact but also the cost can be decreased.

Figure 6:
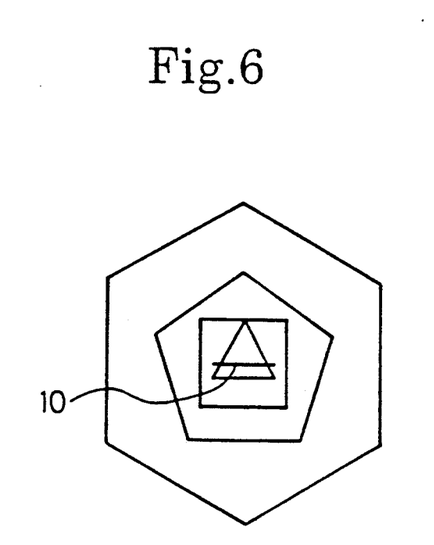
FIG. 6 is a schematic explanatory view showing a relation between the number of mirror surfaces of the reflecting mirror and the size of the reflecting mirror.

Furthermore, by providing only one mirror surface on the reflecting mirror 10, the size of the mirror can be made much smaller than that of the polygon mirror. Generally, lower-limit values of the width L in the scanning direction of a mirror surface of a reflecting mirror and the distance R from the center of rotation of the reflecting mirror to the mirror surface are approximately expressed by the following equations using the number of mirror surfaces, n, the diameter of a light beam incident on a mirror surface, B, and a scanning angle, $\theta$:

In the case of $n \geq 3$:
$R\{\tan(\pi/n) - \tan(\theta/4)\} = B/2\cos(\theta/2)$
$L = 2R\tan(\pi/n)$ In the case of $n \leq 2$:
$R = 0$
$L = B/2\cos(\theta/2)$ If relative sizes of reflecting mirrors having one to six mirror surfaces are determined in accordance with the above equations, assuming that the scanning angle $\theta$ is $\pi/2$, a relationship as shown in FIG. 6 is obtained. As is apparent from FIG. 6, the larger the number of mirror surfaces becomes, the larger the reflecting mirror surface becomes. A reflecting mirror having one mirror surface and a reflecting mirror having two mirror surfaces are the same in size according to the above equation, and the width L in the scanning direction of each mirror surface and the distance R from the center of rotation of each reflecting mirror to the mirror surface become small. In this embodiment, therefore the number of mirror surfaces of the reflecting mirror 10 is set to one. However, even when the reflecting mirror 10 has two mirror surfaces rather than three or more, the mirror can be reduced in size compared to multi-surfaced mirrors.

As mentioned above, by providing only one mirror surface for the reflecting mirror 10, the size of the same mirror can be made much smaller than that of a polygon mirror and hence it is possible to make the light deflecting unit 15 compact. Further, the mass of the reflecting mirror 10 becomes very light in comparison with that of a polygon mirror, and the inertia thereof becomes very small. This is very advantageous in rotating the reflecting mirror 10 at a high speed using an electrostatic force which is weaker in terms of a rotating drive force as compared with an electromagnetic force.

The reflecting mirror 10 may be formed by integral molding with the rotor 11 using a plastic material or glass.

Figure 7:
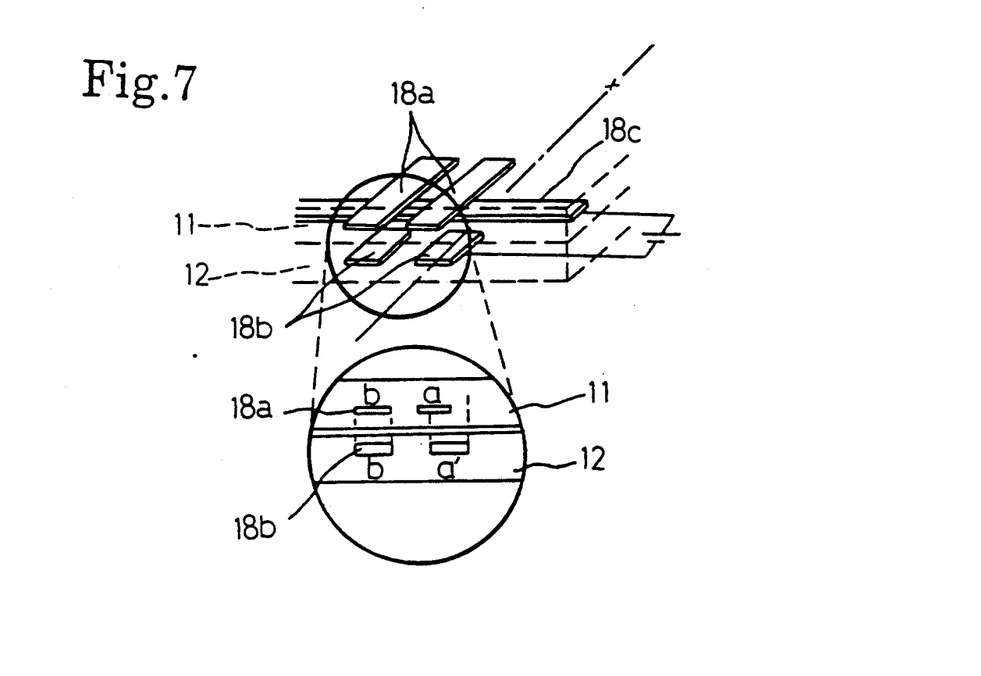
FIG. 7 is a perspective view and an enlarged view of the electrodes of the electrostatic motor for explaining an operation principle of an electrostatic motor.
Figure 8:
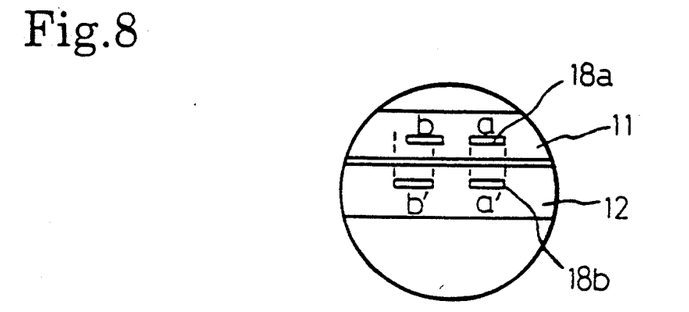
FIG. 8 is an enlarged view of the electrodes of the electrostatic motor.

The operation principle of the electrostatic motor comprising the rotor 11 and the stator 12 will now be described. The electrostatic motor is disclosed in detail in U.S. Pat. No. 4,754,185, which is incorporated herein by reference. A pair of opposed electrodes 18a and 18b, e.g., a-a', of the rotor 11 and the stator 12 form a parallel plate capacity pair deviated from each other, as shown in the enlarged portion of FIG. 7. When a voltage is applied to two electrodes 18b and 18c, e.g., a'-18c, arranged in the radial direction of the stator 12, an electrostatic force is generated so that the pair of opposed electrodes a-a' attract each other and become so aligned as in FIG. 8. At this time, the other pair of opposed electrodes b-b' adjacent to the pair of electrodes a-a' are deviated from each other. Thus, the rotor 11 can be moved in any direction by making the phase of the electrode 18a of the rotor 11 and the electrode 18b of the stator 12 different from each other.

Figure 9:
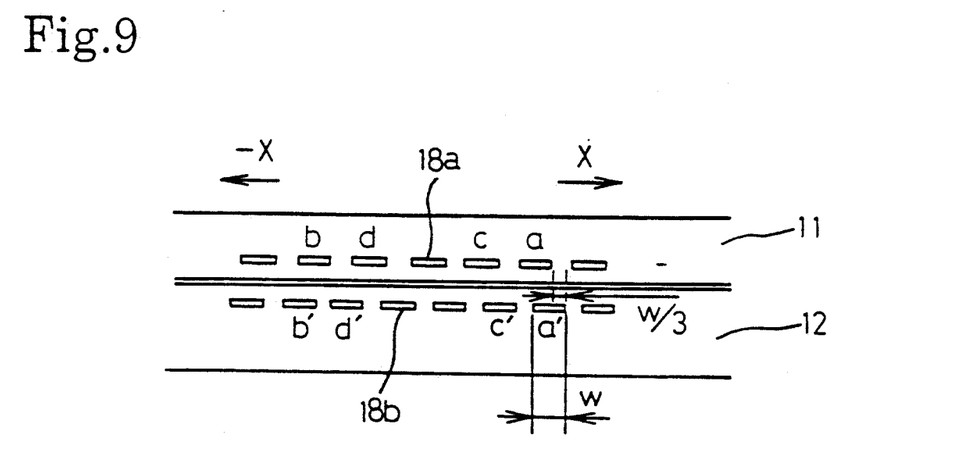
FIG. 9 is also an enlarged view of the electrostatic motor electrodes.

More particularly, as shown in FIG. 9, when the electrodes 18a and 18b of the rotor 11 and the stator 12 are in predetermined relative positions, if a voltage is applied between all of the electrodes 18b which are in the same positional relation as the pair of electrodes a-a' and the electrode 18c, an electrostatic force is generated to align the electrodes a-a', so that the rotor 11 moves by W/3 (W represents the width of each electrode 18a, 18b) in the direction of X. Conversely, if a voltage is applied between all of the electrodes 18b which are in the same positional relation as the other pair of electrodes b-b' shown in FIG. 9 and the electrode 18c, the rotor 11 moves by W/3 in the direction of $-X$. In the former case, a pair of electrodes c-c' adjacent to the pair of electrodes a-a' arrives at a position to continue the movement in the X direction, while in the latter case, a pair of electrodes d-d' adjacent to the pair of electrodes b-b' arrives at a position to continue the movement in the $-X$ direction. Therefore, the rotation of the rotor 11 can be continued by controlling the successive change of voltage applied over the electrodes 18b of the stator 12, where control is effectuated by a switching circuit provided in the controller 13.

Furthermore, the amount of floating of the rotor 11 relative to the stator 12 can be controlled by controlling the voltage applied between the stator electrodes 18b and 18c. Namely, an increase in voltage applied between the stator electrodes 18b and 18c causes the electrostatic force exerted between the electrodes 18a of the rotor and the electrodes 18b of the stator to increase. As a result, the attractive force exerted between the rotor 11 and the stator 12 increases while the amount of floating of the rotor 11 relative to the stator 12 decreases. Moreover, the rotating speed of the rotor 11 can be controlled by controlling the switching speed of the switching circuit in the controller 13. More particularly, the rotating speed of the rotor 11 increases with an increase in switching speed of the switching circuit. For making the rotational direction of the rotor 11 constant, it is necessary that the rotor 11 be stopped in a predetermined position relative to the stator 12 and held in that position until it is next driven.

In the electrostatic motor described above, if it is assumed that the weight of the rotor 11 is $10^{-4}$ Kg and the gap between the rotor 11 and the stator 12 is 10 μm, a torque of $3.7 \times 10^{-5}$ Nm is obtained by applying a voltage of 260 V between the stator electrodes 18b and 18c. This torque is a sufficiently large driving force for starting the rotating motion of the rotor 11 which is at a standstill. Consequently, within several seconds, the rotor 11 integral with the reflecting mirror 10 can perform a high-speed rotation of 30,000 r.p.m or more.

In this embodiment, as set forth above, the inertia during rotation of the rotating portion is very small since the rotating portion of the light deflecting unit 15 includes only the reflecting mirror 10 of a small mass and the disk-like rotor 11 also of a small mass. Consequently, it is possible to make the structure for supporting the rotating portion in a non-contact state very small, i.e., the space occupied by the circular hole 19 of the stator 12, the cylindrical portion 22 of the rotor 11 and the magnetic materials 20a and 20b attached to the circular hole 19 and the cylindrical portion 22, respectively. Accordingly, the loss of kinetic energy during the rotation of the rotor 11 is very small and it becomes possible to perform a high-speed rotation using an electrostatic force which is weaker than an electromagnetic force. Moreover, by using an electrostatic force as the driving force, the structure for rotating the rotor 11 merely includes the very fine aluminum electrodes 18a, 18b and 18c of the rotor 11 and the stator 12. Thus, the light deflecting unit 15 of this embodiment has a very superior advantage of being small in size, simple in structure and inexpensive, despite having a high deflecting speed.

The present invention is not limited to the above embodiment. Various modifications may be made within the scope not departing from spirit of the invention.

Figure 10:
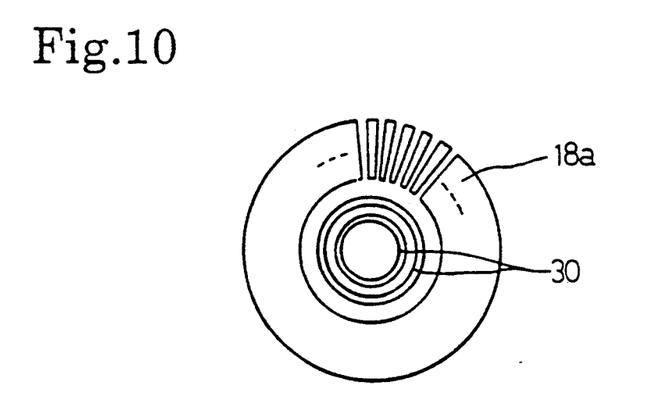
FIG. 10 is a plan view showing an arrangement of rotor electrodes employed in a light deflecting unit in a modification according to the present invention.
Figure 11:
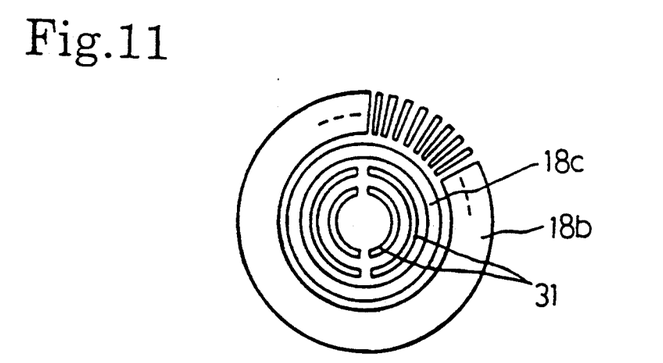
FIG. 11 is a plan view showing an arrangement of stator electrodes in the light deflecting unit illustrated in FIG. 10.

For example, for imparting a central restraint force to the rotor 11 there may be adopted a structure, as shown in FIG. 10, wherein a plurality of concentric electrodes 30 are provided at the rotational center of the rotor 11, while as shown in FIG. 11, a plurality of concentric electrodes 31 are disposed in the stator 12 in positions opposed to the concentric electrodes 30 of the rotor 11. The concentric electrodes 31 of the stator 12 are divided in two areas, shown as right and left semicircular areas in FIG. 11. The concentric electrodes 30 and 31 of the rotor 11 and stator 12 constitute capacitors, respectively. Therefore, when voltages opposite in polarity are applied to the two areas of the concentric electrodes 31 of the stator 12, an attractive force based on an electrostatic force is generated between the concentric electrodes 30 and 31. This electrostatic force acts as a central restraint force for holding the rotor 11 at its rotational center.

Figure 12:
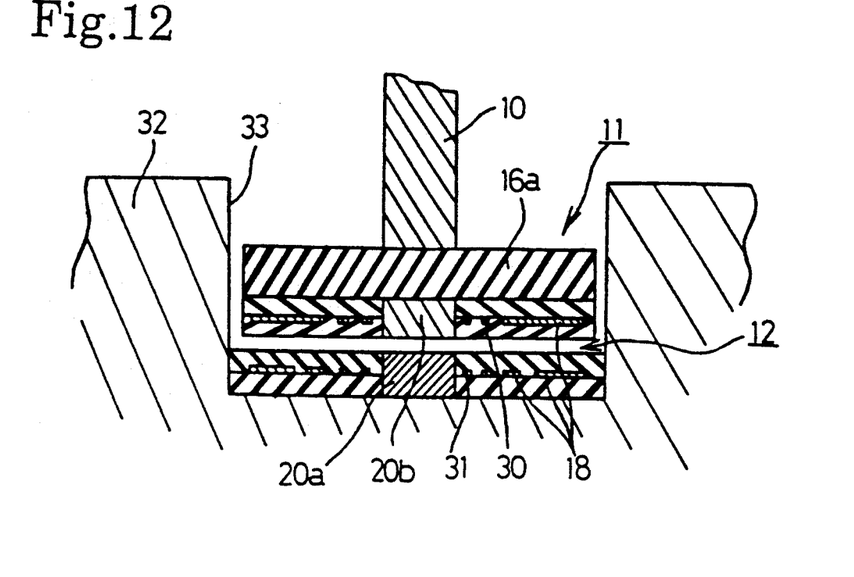
FIG. 12 is a sectional view of the light deflecting unit illustrated in FIG. 10.

By generating such a restraint force using the concentric electrodes 30 and 31 it is possible to omit the cylindrical portion 22 of the rotor 11 and the circular hole 19 of the stator 12 which are used in the above embodiment. Consequently, the opposed surfaces of the rotor 11 and the stator 12 can be made flat, thus permitting the rotor-stator fabrication process to be greatly simplified. In this case, the center of the rotor 11 may largely deviate from the center of the stator 12 because there is no fitting portion comprising the cylindrical portion 22 of the rotor 11 and the circular hole 19 of the stator 12. For preventing an extreme deviation of the rotor 11, a structure as shown in FIG. 12 may be used wherein the stator 12 is formed is casing 32 on the bottom of a circular hole 33 having sides which restrict the outer periphery of the rotor 11. Also, since the attractive force between the rotor 11 and the stator 12 can be controlled by controlling the voltage to be applied to the concentric bisected electrodes 31 of the stator, it is possible to control the central restraint force imparted to the rotor 11 and hence the amount of floating of the rotor.

Figure 13:
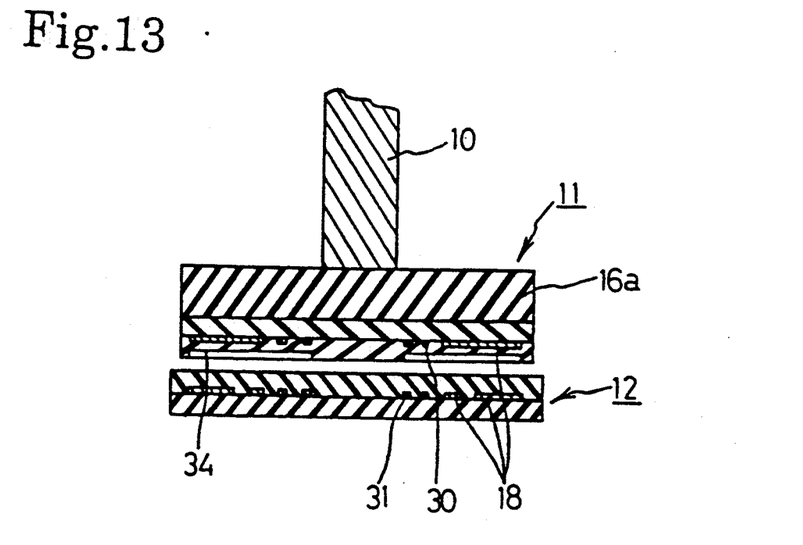
FIG. 13 is a sectional view of a light deflecting unit in another modification according to the present invention.
Figure 14:
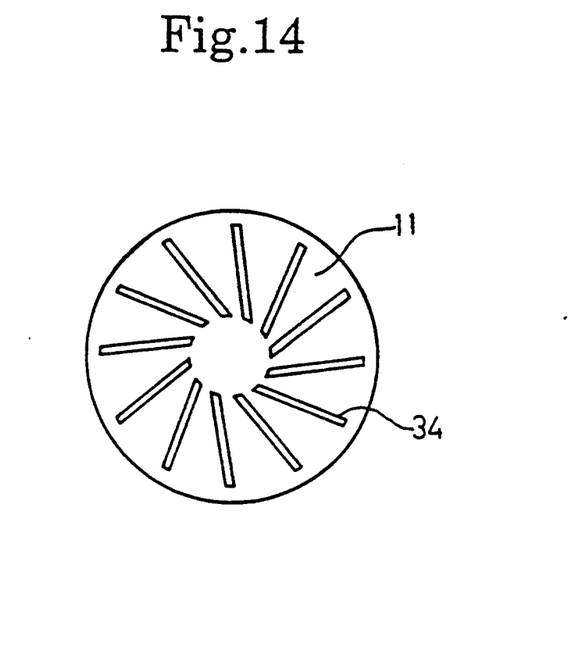
FIG. 14 is a bottom view of a rotor in the light deflecting unit illustrated in FIG. 13.

As shown in FIGS. 13 and 14, a plurality of air guide slots 34 may be provided in the rotor 11 for supporting the rotor 11 in a state of non-contact with the stator 12 during rotation of the rotor. As the rotor 11 is rotated, air is positively introduced between the rotor 11 and the stator 12 through the air guide slots 34. Therefore, while the rotor 11 is rotating at a high speed, it floats from the stator 12 due to a viscous resistance of the air introduced through the air guide slots 34, although the rotor contacts the stator while it is at a standstill or is rotating at a low speed. By thus floating the rotor 11 using the air guide slots 34, it is possible to omit the magnetic materials 20a and 20b of the stator 12 and rotor 11, respectively, which are used in the above embodiment. Consequently, it is possible to reduce the number of components of the rotor 11 and the stator 12 and to manufacture the two inexpensively. Air guide slots may also be formed in the stator, either instead of being formed in the rotor or in addition to being formed in the rotor. It is apparent that liquid and other lubricants, as well as gas, are employable as media for obtaining a viscous resistance.

Figure 15:
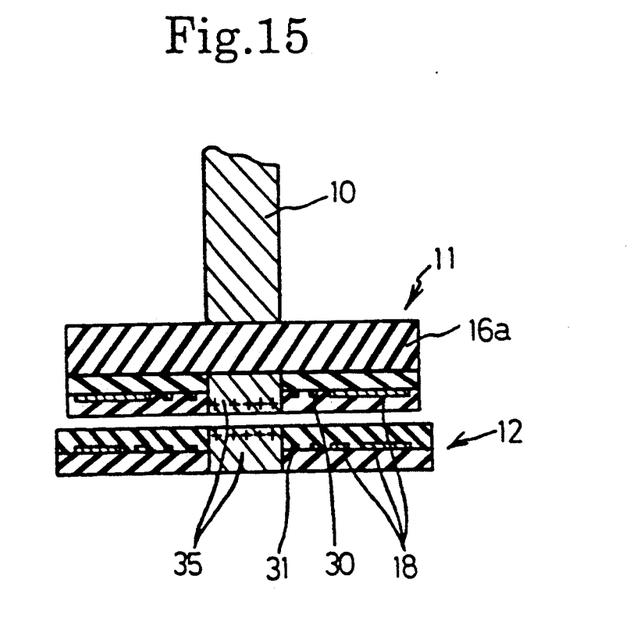
FIG. 15 is a sectional view of a light deflecting unit in a further modification according to the present invention.

As shown in FIG. 15, for supporting the rotor 11 in a state of non-contact with the stator 12 during rotation of the rotor, electric charge holding layers 35 may be provided centrally of the stator 12 and the rotor 11. In this case, by making the opposed surfaces of the electric charge holding layers 35 identical in polarity, it is possible to float the rotor 11 using a repulsive force based on an electrostatic force. Pre-charged insulators or conductors into which an electric charge is introduced may be used as the electric charge holding layer 35.

Figure 16:
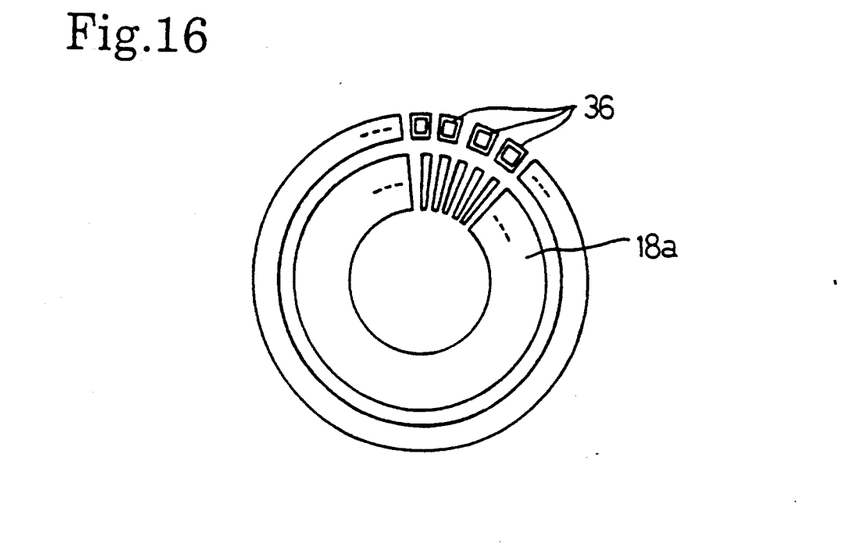
FIG. 16 is a plan view showing an arrangement of rotor electrodes used in a light deflecting unit in a still further modification according to the present invention.
Figure 17:
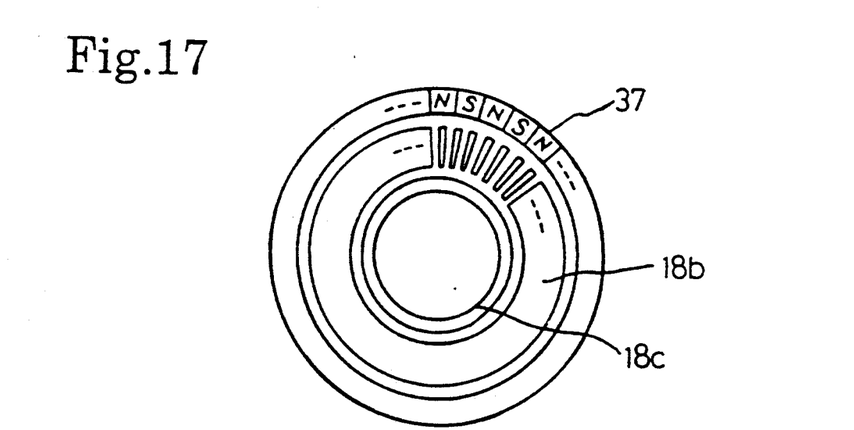
FIG. 17 is a plan view showing an arrangement of stator electrodes in the light deflecting unit illustrated in FIG. 16.

Additionally, for supporting the rotor 11 in a state of non-contact with the stator 12 during rotation of the rotor 11, closed loop coils 36 are formed around the electrodes 18a of the rotor 11, as shown in FIG. 16, while magnetized patterns 37 of a magnetic material are formed in positions of the stator 12 corresponding to the closed loop coils 36 of the rotor 11 as shown in FIG. 17. In this case, a repulsive force is generated between the rotor 11 and the stator 12 due to an induction field created when the closed loop coils 36 of the rotor cross the magnetized patterns 37 of the stator.

Figure 18:
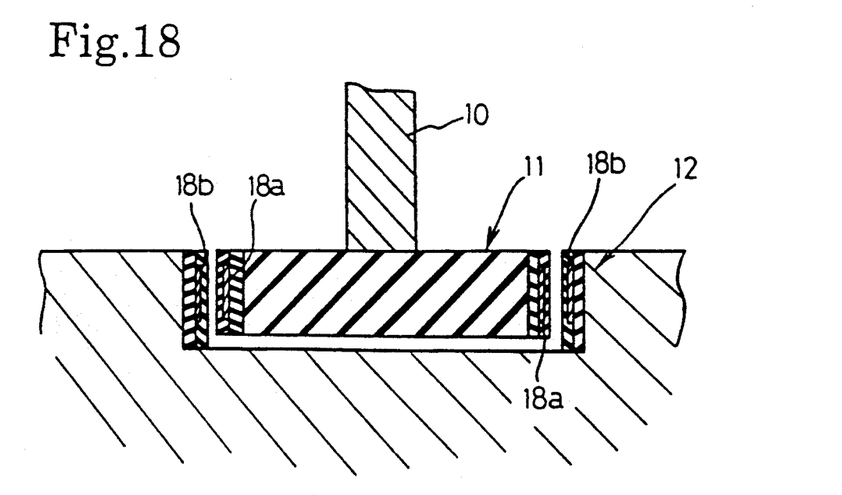
FIG. 18 is a sectional view of a light deflecting unit in a still further embodiment according to the present invention.

FIG. 18 shows a further modification in which the electrodes 18b of the stator 12 are formed on the inner side face of a cylindrical portion, while the electrodes 18a of the rotor 11 are formed on the outer side face, which is cylindrical, of the rotor 11. In this case, the rotor center holding force can be greatly improved.

In order to minimize the windage loss of the reflecting mirror 10, the rotor 11 and the reflecting mirror 10 may be disposed in a container held in a vacuum or under a reduced pressure. In this case, the constant speed rotation of the reflecting mirror 10 can be made stabler because the air resistance exerted on the reflecting mirror 10 can be negated.

Although an example of application of the present invention to a light scanning device of a xerographic printer has been described in the above embodiment, the present invention is applicable not only to xerographic printers but also to any apparatus requiring the deflection of a light beam such as, for example, image readers and displays.

It is also possible to rotate the reflecting mirror intermittently and thereby control a polarizing angle of a light beam intermittently. The electrostatic motor can be used as an electrostatic stepping motor having a very high angular resolution controlling ability by the adoption of a fine processing technique for electrodes. Therefore, the present invention is also applicable to pointers, laser markers and the like.

I claim:

1. A light deflecting unit for deflecting a light beam, comprising:
   a stator having a plurality of stator electrodes and a first surface;
   a rotor rotatably provided on said stator, having a plurality of rotor electrodes opposed to said stator electrodes of said stator and a second surface generally perpendicular to the axis of rotation of said rotor;
   a reflecting mirror supported by said rotor and rotatable together with said rotor;
   driving means for selectively applying a voltage to said stator electrodes to drive said rotor by an electrostatic force; and
   supporting means for supporting said rotor in a non-contact state with said stator, said first surface being opposed and spaced from said second surface, at least while said rotor is driven by said driving means.

2. The light deflecting unit according to claim 1, wherein said reflecting mirror has at most two mirror surfaces.

3. The light deflecting unit according to claim 2, wherein said reflecting mirror has a single mirror surface.

4. The light deflecting unit according to claim 1, wherein said supporting means is located on said stator and said rotor.

5. The light deflecting unit according to claim 4, wherein said stator electrodes are radially arranged in said first surface of said stator and said rotor electrodes are radially arranged in said second surface of said rotor.

6. The light deflecting unit according to claim 4, wherein said supporting means includes a first magnetic material provided on said first surface of said stator and a second magnetic material provided on said second surface of said rotor, confronting surfaces of said first and second magnetic materials being magnetized to a same polarity.

7. The light deflecting unit according to claim 4, wherein said supporting means includes at least one air guide slot formed on one of said second surface of said rotor and first surface of said stator to introduce air between said stator and said rotor.

8. The light deflecting unit according to claim 4, wherein said supporting means includes a first electric charge holding layer provided on one of said first surface of said stator and said second surface of said rotor and a second electric charge holding layer provided on the other of said first surface of said stator and said second surface of said rotor, confronting surfaces of said first and second electric charge holding layers being charged to a same polarity.

9. The light deflecting unit according to claim 1, wherein said rotor is formed in a disk-like shape and said stator is formed with a cylindrical depression in which at least a portion of said rotor is disposed.

10. The light deflecting unit according to claim 9, wherein said stator electrodes are formed on an inner side face of said cylindrical depression of said stator and said rotor electrodes are formed on an outer side face of said portion of said rotor disposed in said depression.

11. The light deflecting unit according to claim 1, wherein one of said rotor and said stator has a protrusion therein and the other of said rotor and stator has a depression therein for loosely receiving said protrusion.

12. The light deflecting unit according to claim 11, wherein said protrusion is a centrally disposed cylinder.

13. The light deflecting unit according to claim 1, wherein said supporting means comprises a closed loop coil disposed on one of said rotor and said stator, and a magnetic material formed in a magnetized pattern corresponding to the coil formed on the other of said rotor and said stator.

14. The light deflecting unit according to claim 1, further comprising rotational position detecting means for detecting a rotational position of said rotor.

15. The light deflecting unit according to claim 14, wherein said rotational position detector is disposed on said stator.

16. A light scanning device comprising:
   laser beam generating means for generating a laser beam;
   a stator having a plurality of stator electrodes and a first surface;
   a rotor rotatably provided on said stator, having a plurality of rotor electrodes opposed to said stator electrodes of said stator and a second surface generally perpendicular to the axis of rotation of said rotor;
   a reflecting mirror provided on said rotor to reflect the laser beam generated by said laser beam generating means;
   driving means for selectively applying a voltage to said stator electrodes to drive said rotor by an electrostatic force; and
   supporting means for supporting said rotor in a non-contact state with said stator, said first surface being opposed and spaced from said second surface, at least while said rotor is driven by said driving means.

17. The light scanning device according to claim 16, further comprising rotational position detecting means for detecting a rotational position of said rotor and generating a detecting signal for use as a reference signal indicating a reference position of said reflecting mirror.

18. The light scanning device according to claim 16, further comprising a focusing lens for focusing said laser beam reflected by said mirror.

19. The light scanning device according to claim 16, further comprising a beam expanding optical system for expanding the generated laser beam, and wherein said laser beam generating means includes a collimator lens.

20. The light scanning device according to claim 16, wherein said stator has a plurality of concentric semicircular electrodes and said rotor has a plurality of concentric annular electrodes for maintaining said rotor centrally disposed with respect to said stator.

* * * * *